(12) United States Patent
Pang et al.

(10) Patent No.: US 12,099,865 B2
(45) Date of Patent: Sep. 24, 2024

(54) VIRTUAL MACHINE SYSTEM AND VIRTUAL MACHINE PROVISIONING METHOD USING THE SAME

(71) Applicant: COONTEC CO., LTD., Gyeonggi-do (KR)

(72) Inventors: Hyunk Jun Pang, Gyeonggi-do (KR); Jin Won Yang, Gyeonggi-do (KR)

(73) Assignee: COONTEC CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/285,438

(22) PCT Filed: Dec. 6, 2022

(86) PCT No.: PCT/KR2022/019714
§ 371 (c)(1),
(2) Date: Oct. 3, 2023

(65) Prior Publication Data
US 2024/0176642 A1 May 30, 2024

(30) Foreign Application Priority Data
Nov. 29, 2022 (KR) .................. 10-2022-0163161

(51) Int. Cl.
*G06F 9/455* (2018.01)
(52) U.S. Cl.
CPC ............ *G06F 9/45558* (2013.01); *G06F 2009/45583* (2013.01)
(58) Field of Classification Search
None
See application file for complete search history.

(56) References Cited

U.S. PATENT DOCUMENTS

| 8,443,077 | B1* | 5/2013 | Lappas | G06F 3/0619 709/224 |
| 10,228,964 | B2* | 3/2019 | CaraDonna | G06F 11/14 |
| 11,748,143 | B2* | 9/2023 | Kumar | G06F 3/0649 718/1 |
| 2008/0222375 | A1* | 9/2008 | Kotsovinos | G06F 3/0617 709/230 |
| 2012/0066677 | A1* | 3/2012 | Tang | G06F 9/4856 718/1 |

(Continued)

FOREIGN PATENT DOCUMENTS

| EP | 2019358 A1 * | 1/2009 | ......... G06F 9/45558 |
| EP | 2 996 038 A1 | 3/2016 | |

(Continued)

*Primary Examiner* — Kenneth Tang
(74) *Attorney, Agent, or Firm* — The PL Law Group, PLLC

(57) ABSTRACT

A virtual machine provisioning method according to an embodiment includes a provisioning module that creates a virtual machine image template including only an operating system image and a system file image, a virtual machine management module that extracts the OS image of the virtual machine image template according to a virtual machine creation command from a user, to load the OS image into a memory allocated a virtual machine, and execute the OS image, and an interface module that extracts a system file image of the virtual machine image template according to the virtual machine creation command to build a root file system for the virtual machine.

14 Claims, 4 Drawing Sheets

(56) References Cited

U.S. PATENT DOCUMENTS

| | | | |
|---|---|---|---|
| 2012/0144391 A1* | 6/2012 | Ueda | G06F 9/45558 |
| | | | 718/1 |
| 2012/0303858 A1* | 11/2012 | Ginzton | G06F 9/45533 |
| | | | 711/6 |
| 2013/0275375 A1* | 10/2013 | Nickolov | G06F 16/188 |
| | | | 707/636 |
| 2016/0077855 A1* | 3/2016 | Zu | G06F 9/45533 |
| | | | 718/1 |
| 2018/0253361 A1* | 9/2018 | Dhatrak | G06F 11/328 |
| 2018/0267823 A1* | 9/2018 | Carr | G06F 9/45558 |
| 2019/0026138 A1* | 1/2019 | Cao | G06F 8/63 |
| 2021/0011754 A1* | 1/2021 | Dornemann | G06F 3/065 |
| 2021/0357246 A1* | 11/2021 | Kumar | G06F 11/1469 |
| 2023/0297403 A1* | 9/2023 | Kumar | G06F 9/45558 |
| | | | 718/1 |

FOREIGN PATENT DOCUMENTS

| | | |
|---|---|---|
| JP | 2010-522370 A | 7/2010 |
| KR | 10-2009-0065126 A | 6/2009 |
| KR | 10-2013-0047491 A | 5/2013 |
| KR | 10-2013-0131963 A | 12/2013 |
| KR | 10-2015-0109692 A | 10/2015 |
| KR | 10-2017-0014804 A | 2/2017 |
| KR | 10-2019799 B1 | 9/2019 |

\* cited by examiner

VIRTUAL MACHINE SYSTEM AND VIRTUAL MACHINE PROVISIONING METHOD USING THE SAME

CROSS REFERENCE TO RELATED APPLICATIONS AND CLAIM OF PRIORITY

This application claims benefit under 35 U.S.C. 119, 120, 121, or 365 (c), and is a National Stage entry from International Application No. PCT/KR2022/019714, filed Dec. 6, 2022, which claims priority to the benefit of Korean Patent Application 1 No. 10-2022-0163161 filed on Nov. 29, 2022, in the Korean Intellectual Property Office, the entire contents of which are incorporated herein by reference.

BACKGROUND

1. Technical Field

Embodiments of the present disclosure relate to a virtual machine provisioning technology.

2. Background Art

Generally, virtualization refers to a technology that uses resources efficiently by logically dividing one physical computer resource. Here, a collection of resources required for a computing environment is called a virtual machine. In order to build a virtual machine-based virtual infrastructure, a physical node on which the virtual machine is created and a virtual machine disk to be created onto the physical node are required. A process of creating such a virtual machine, installing an operating system thereon, and providing it to a user is called provisioning.

In a case where an entire virtual machine image is copied and used when provisioning the virtual machine, if many virtual machines are created, there is a problem in that the provisioning requires a lot of time and system resources, which slows down provisioning speed and requires a large amount of memory due to memory shortage.

SUMMARY

Embodiments of the present disclosure are intended to provide a virtual machine system that can improve the provisioning speed and reduce memory usage, and a virtual machine provisioning method using the same.

A virtual machine provisioning method according to creating, by a an embodiment disclosed includes provisioning module, a virtual machine image template including only an operating system image and a system file image that have a read-only property of a virtual machine image, extracting, by a virtual machine management module, the OS image of the virtual machine image template according to a virtual machine creation command from a user, to load the OS image into a memory allocated to a virtual machine, and execute the OS image, and extracting, by an interface module, the system file image of the virtual machine image template according to the virtual machine creation command to build a root file system for the virtual machine.

The system file image of the built root file system may be commonly used for each virtual machine.

The virtual machine provisioning method may further include storing, by the virtual machine management module, a system configuration file image created based on system setting set by the user for each virtual machine and a user data file image created according to execution of each virtual machine in a disk storage.

In the storing in the disk storage, for each virtual machine, the system configuration file image and the user data file image may be stored in the disk storage by separating the file images as a partition.

The virtual machine provisioning method may further include connecting, by the interface module, the system configuration file image and the user data file image stored in the disk storage to the built root file system.

The virtual machine provisioning method may further include connecting, by the virtual machine management module, the OS image of each virtual machine to the built root file system through the interface module.

In the connecting, the OS image of each virtual machine may be connected to the system configuration file image and the user data file image of the corresponding virtual machine in the built root file system.

A virtual machine system according to an embodiment disclosed includes a provisioning module that creates a virtual machine image template including only an operating system image and a system file image that have a read-only property of a virtual machine image, a virtual machine management module that extracts the OS image of the virtual machine image template according a virtual machine creation command from a user, to load the OS image into a memory allocated to a virtual machine, and execute the OS image, and an interface module that extracts the system file image of the virtual machine image template according to the virtual machine creation command to build a root file system for the virtual machine.

The system file image of the built root file system may be commonly used for each virtual machine.

The virtual machine management module may store a system configuration file image created based on system setting set by the user for each virtual machine and a user data file image created according to execution of each virtual machine in a disk storage.

The virtual machine management module may store, for each virtual machine, the system configuration file image and the user data file image in the disk storage by separating the file images as a partition.

The interface module connect the system configuration file image and the user data file image stored in the disk storage to the built root file system.

The virtual machine management module may connect the OS image of each virtual machine to the built root file system through the interface module.

The virtual machine management module may connect the OS image of each virtual machine to the system configuration file image and the user data file image of the corresponding virtual machine in the built root file system through the interface module.

According to the disclosed embodiments, a virtual machine image template is configured with only the OS image and the system file image commonly used in each virtual machine, and then the OS image of the virtual machine image template is immediately loaded into the memory of the virtual machine and executed, and the root file system is built using only the system file image of the virtual machine image template, thereby improving speed of virtual machine provisioning and reducing resource usage therefor.

In this case, by allowing the system configuration file image and user data file image separated for each virtual machine and stored in the disk storage to be connected to the root file system after virtual machine provisioning, the system configuration file image and user data file image do not need to be performed when provisioning a virtual machine and thus, the provisioning speed can be further improved and resource usage can be further reduced.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. Further, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

Further, terms such as first, second, etc., may be used to describe various components, but the components are not limited by the terms. The above terms may be used for the purpose of distinguishing one component from another. For example, a first component may be termed a second component, and similarly, a second component may be termed a first component, without departing from the scope of the present disclosure.

In this specification, "virtual machine" is a conceptual term corresponding to a physical machine composed of hardware, and may refer to a virtual computer that allows multiple operating systems to run on one physical machine in a virtualization environment, or a specific operating system or operating environment. "Virtual machine image" may refer to an image file containing all software required to run a virtual machine.

Figure 1:
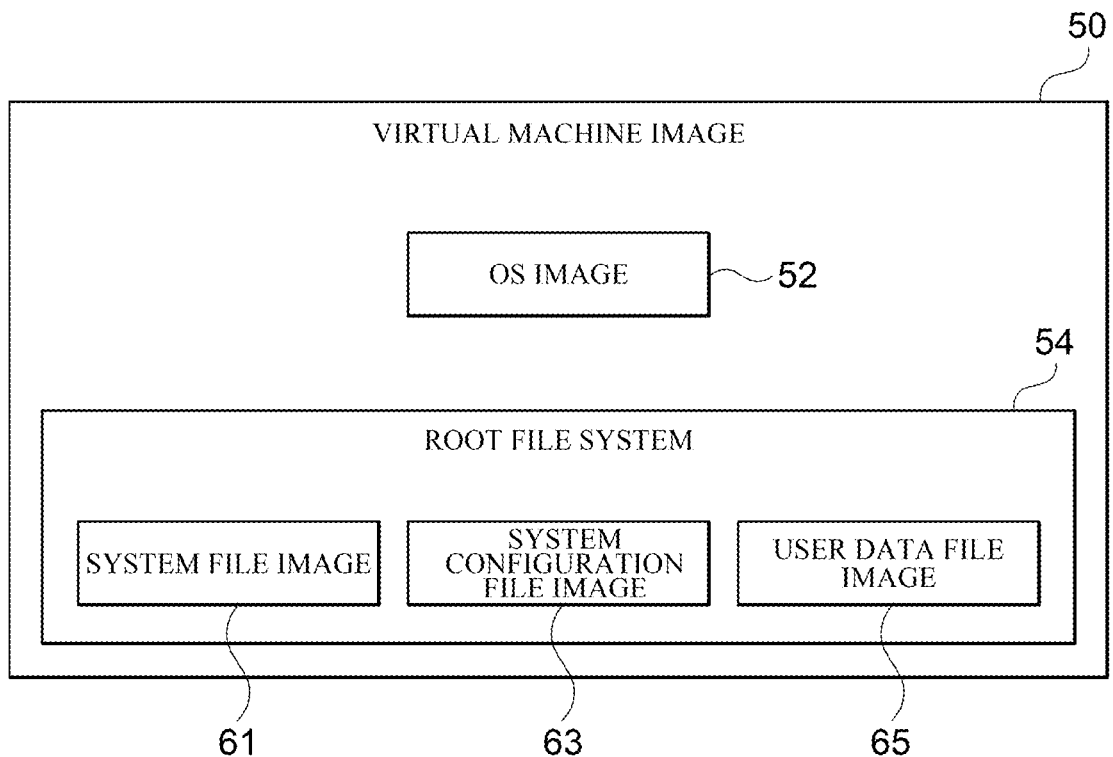
FIG. 1 is a diagram illustrating components of a virtual machine image.

FIG. 1 is a diagram illustrating the components of a virtual machine image.

Referring to FIG. 1, a virtual machine image 50 is configured with an operating system image 52 and a root file system 54. Further, the root file system 54 may include a system file image 61, a system configuration file image 63, and a user data file image 65.

Here, the OS image 52 may refer to an image file required to run an operating system of the virtual machine. The OS image 52 has a read-only property.

The system file image 61 may refer to basic files of the system used when booting the virtual machine. The system file image 61 has the read-only property.

The system configuration file image 63 may refer to system-related configuration files that are changed when the virtual machine is run. The system configuration file image 63 has read and write properties.

The user data file image 65 is data files created by the user in the process of using the service through the virtual machine, and may include various document files, custom files, software files installed directly by the user, etc. The user data file image 65 has read and write properties.

In the disclosed embodiment, a virtual image template for virtual machine provisioning may be created using only the OS image 52 and the system file image 61 having the read-only property based on the property of the virtual machine image 50. A detailed description thereof will be made later.

Figure 2:
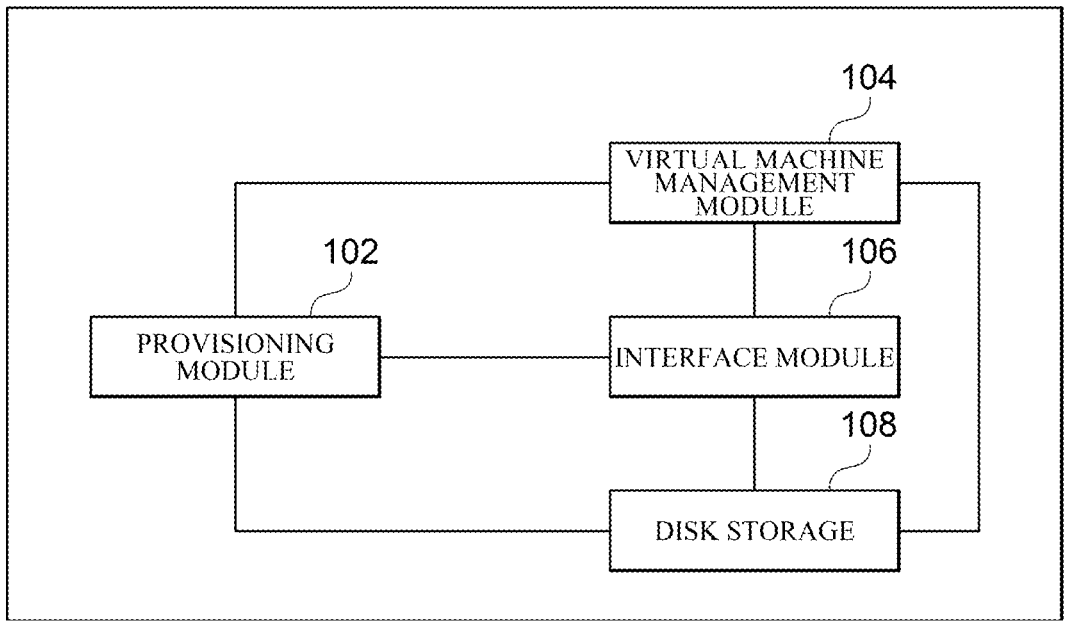
FIG. 2 is a diagram illustrating a configuration of a virtual machine provisioning system according to an embodiment of the present disclosure.

FIG. 2 is a diagram illustrating the configuration of a virtual machine provisioning system according to an embodiment of the present disclosure.

Referring to FIG. 2, a virtual machine provisioning system 100 may include a provisioning module 102, a virtual machine management module 104, an interface module 106, and a disk storage 108.

The virtual machine provisioning system 100 is a system for virtual machine provisioning. The virtual machine provisioning may refer to the process of creating the virtual machine, installing an operating system thereon, and providing it to the user.

In one embodiment, the provisioning module 102, the virtual machine management module 104, and the interface module 106 may be implemented using one or more physically separate devices, one or more processors, or a combination of one or more processors and software, and may not be clearly distinguished in specific operations, unlike the example illustrated.

The provisioning module 102 may create a virtual machine image template for virtual machine provisioning. The virtual machine image template may be a pre-stored virtual machine image commonly used for each virtual machine. The provisioning module 102 may create and store the virtual machine image template in advance. The provisioning module 102 may create the virtual machine image template based on the property of the virtual machine image.

Figure 3:
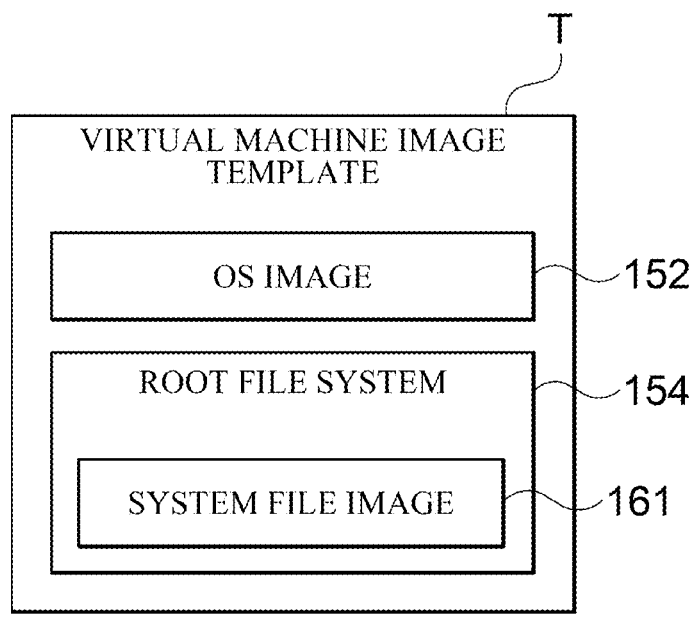
FIG. 3 is a diagram illustrating a virtual machine image template according to an embodiment of the present disclosure.

Here, the virtual machine image template may be configured to include only an OS image 152 and a system file image 161, as illustrated in FIG. 3. That is, the virtual machine image template 150 may be configured to include only the OS image 152 and the system file image 161 in a root file system 154.

In one embodiment, the provisioning module 102 may generate the virtual machine image template including the OS image 152 and the system file image 161 depending on the type of operating system of the virtual machine, but is not limited thereto. The provisioning module 102 may create the virtual machine image template for each OS type of the virtual machine. Hereinafter, for convenience of description, description will be made on the assumption that the virtual machine has one OS type.

As such, the virtual machine image template 150 is configured to include only the OS image 152 and the system file image 161 that have the read-only property, and the system configuration file image and user data file image having read and write properties may be excluded.

The provisioning module 102 may extract the OS image 152 from the virtual machine image template 150 at the request of the virtual machine management module 104 and deliver the OS image 152 to the virtual machine management module 104. The provisioning module 102 may extract the corresponding OS image 152 according to the type of virtual machine being created and deliver the OS image 152 to the virtual machine management module 104. Further, the provisioning module 102 may extract the system 161 from the virtual machine image template 150 and deliver the system file image 161 to the interface module 106. The provisioning module 102 may extract the corresponding system file image 161 according to the type of virtual machine being created and deliver the system file image 161 to the interface module 106.

The virtual machine management module 104 may receive the OS image 152 from the provisioning module 102 when a virtual machine creation command is input from the user through a network. The virtual machine management module 104 may load the OS image 152 delivered from the provisioning module 102 into the memory allocated to each virtual machine and execute the OS image 152.

That is, according to the disclosed embodiment, if there is the virtual machine creation command, the OS image 152 may be extracted from the virtual machine image template 150, loaded directly into the memory of the virtual machine, and executed without creating a new instance of the OS image 152.

The virtual machine management module 104 may store the system configuration file image in the disk storage 108 based on the system settings set by the user for each virtual machine. Further, the virtual machine management module 104 may store the user data file image created as each virtual machine is run in the disk storage 108. Here, the virtual machine management module 104 may store the system configuration file image and the user data file image for each virtual machine by separating the file images as a partition in the disk storage 108.

Further, the virtual machine management module 104 may connect the OS image 152 of each virtual machine to the root file system through the interface module 106. A detailed description thereof will be made later with reference to FIG. 4.

The interface module 106 may request and receive the system file image 161 stored in a virtual machine image template T from the provisioning module 102 according to a virtual machine creation command from the user. The interface module 106 may build a root file system for the virtual machine using the system file image 161 of the virtual machine image template T. Here, the system file image 161 of the root file system may be commonly used for each virtual machine.

The interface module 106 may connect the system configuration file image and the user data file image stored in the disk storage 108 for each virtual machine to the built root file system. Further, the interface module 106 may connect the OS image 152 of each virtual machine to the built root file system. In this case, the interface module 106 may connect the OS image 152 of each virtual machine to the system configuration file image and the user data file image of the corresponding virtual machine.

The disk storage 108 may store the system configuration file image and the user data file image by separating the file images as the partition for each virtual machine under the control of the virtual machine management module 104. The disk storage 108 may store the root file system under the control of the interface module 106.

In this specification, a module may refer to a functional and structural combination of hardware for carrying out the technical idea of the present disclosure and software for driving the hardware. For example, the "module" may mean a logical unit of hardware resources for executing a predetermined code and the predetermined code, and does not necessarily mean a physically connected code or a single type of hardware.

Figure 4:
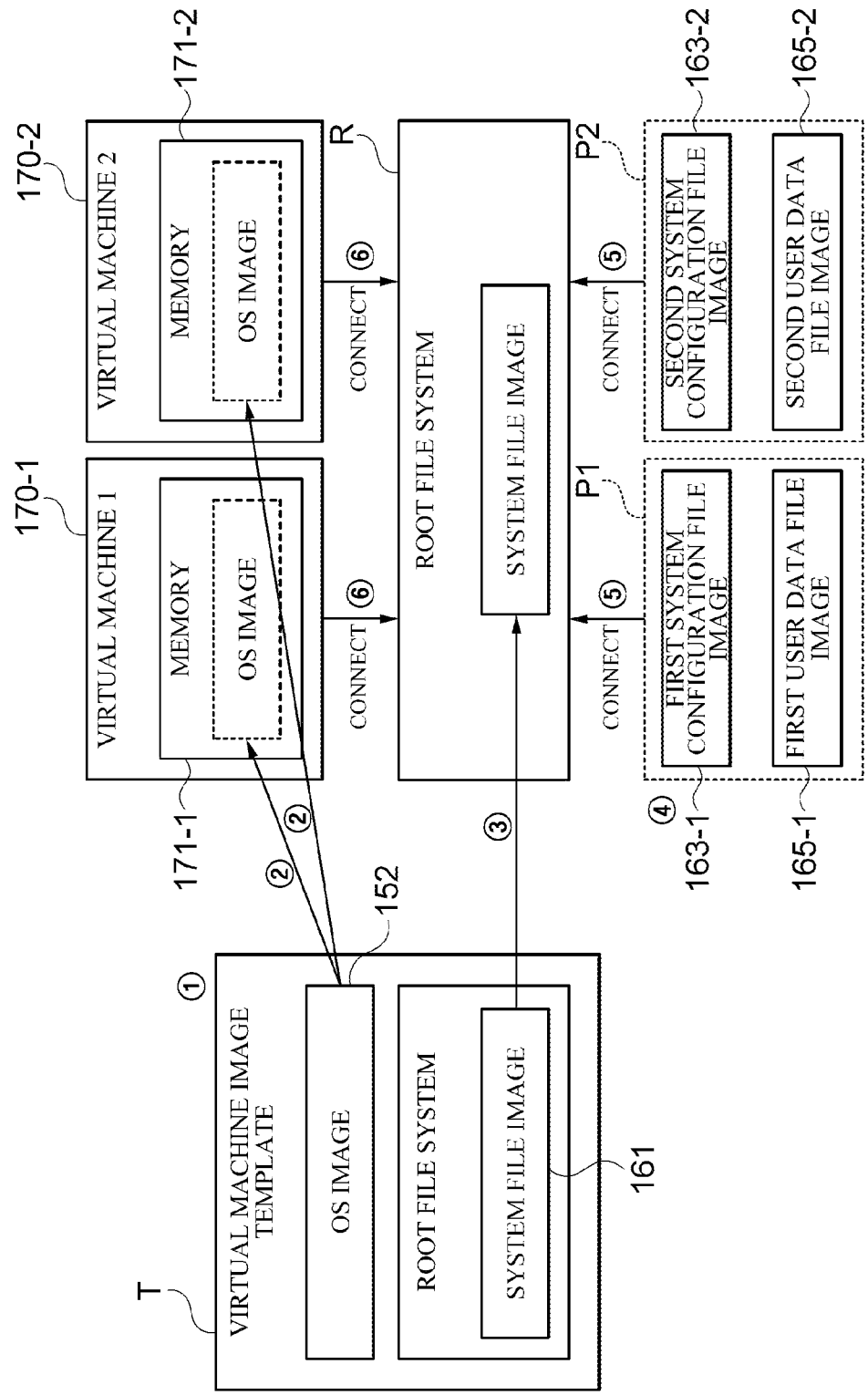
FIG. 4 is a diagram illustrating a virtual machine provisioning method according to an embodiment of the present disclosure.

FIG. 4 is a diagram illustrating a virtual machine provisioning method according to an embodiment of the present disclosure.

Referring to FIG. 4, the provisioning module 102 may create the virtual template T for virtual machine provisioning (①). The virtual machine image template T may be configured to include only the OS image 152 and the system file image 161.

Here, by building the virtual machine image template T with only the OS image 152 and the system file image 161 commonly used in each virtual machine, it is possible to improve the speed of virtual machine provisioning and reduce resource usage, as will be described later.

Next, when the virtual machine creation command is input from the user, the virtual machine management module 104 may receive the OS image 152 of the virtual machine image template T from the provisioning module 102, load the OS image 152 into the memory allocated to the virtual machine, and execute the OS image 152 (②). In this case, the virtual machine management module 104 may request and receive the OS image 152 stored in the virtual machine image template T from the provisioning module 102.

For example, when the virtual machine management module 104 creates a first virtual machine 170-1 and a second virtual machine 170-2 according to the virtual machine creation command, the virtual machine management module 104 may load the OS image 152 delivered from the provisioning module 102 into a first memory 171-1 allocated to the first virtual machine 170-1 and execute the OS image 152 and load the OS image 152 into a second memory 171-2 allocated to the second virtual machine 170-2 and execute the OS image 152.

Here, since the OS image 152 is directly loaded into the memory of the virtual machine and executed without creating a separate instance when provisioning the virtual machine, the time and disk usage for instance can be reduced when provisioning the virtual creation machine. In particular, when creating a large number of virtual machines, resource usage of the virtual machine system 100 can be effectively reduced.

Next, according to the virtual machine creation command from the user, the interface module 106 may receive the system file image 161 of the virtual machine image template T from the provisioning module 102 and build a root file system R (③).

In this case, the interface module 106 may request and receive the system file image 161 stored in the virtual machine image template T from the provisioning module 102. The root file system R including the system file image 161 may be built in the disk storage 108, but is not limited thereto, and may be built in the memory of the virtual machine system 100 by being stored therein.

Here, the root file system R may be commonly used (i.e., shared) in the respective virtual machines. That is, the system file image 161 of the root file system R may be commonly used in the respective virtual machines.

Next, the virtual machine management module 104 may store the system configuration file image created based on system setting set by the user for the virtual machine and the user data file image created according to execution of the virtual machine in the disk storage 108 (④).

Here, the virtual machine management module 104 may store the system configuration file images and the user data file images for each virtual machine by separating the file images as a partition in the disk storage 108.

For example, the virtual machine management module 104 may store a first system configuration file image 163-1 created based on system setting set by the user for a first virtual machine 170-1 and a first user data file image 165-1 created according to execution of the first virtual machine 170-1 in a first partition P1 of the disk storage 108.

Further, the virtual machine management module 104 may store a second system configuration file image 163-2 created based on system setting set by the user for a second virtual machine 170-2 and a second user data file image 165-2 created according to execution of a second virtual machine 170-2 in a second partition P2 of the disk storage 108.

Next, the interface module 106 may connect the system configuration file image and the user data file image stored in the disk storage 108 to the previously built root file system R (⑤).

For example, the interface module 106 may connect the first system configuration file image 163-1 and the first user data file image 165-1 stored in the first partition P1 of the disk storage 108 to the root file system R. Further, the interface module 106 may connect (mount) the second system configuration file image 163-2 and the second user data file image 165-2 stored in the second partition P2 of the disk storage 108 to the previously built root file system R.

Next, the virtual machine management module 104 may connect (mount) the OS image 152 of each virtual machine to the previously built root file system R through the interface module 106 (⑥).

That is, the virtual machine management module 104 may connect the OS image 152 of the first virtual machine 170-1 to the previously built root file system R through the interface module 106. In this case, the interface module 106 may connect the OS image 152 of the first virtual machine 170-1 to the first system configuration file image 163-1 and the first user data file image 165-1 in the previously root file system R.

Further, the virtual machine management module 104 may connect (mount) the OS image 152 of the second virtual machine 170-2 to the previously built root file system R through the interface module 106. In this case, the interface module 106 may connect the OS image 152 of the second virtual machine 170-2 to the second system configuration file image 163-2 and the second user data file image 165-2 in the previously built root file system R.

Here, the system file image 161 of the previously built root file system R is commonly used for the respective virtual machines 170-1 and 170-2, and thus the respective virtual machines 170-1 and 170-2 may fully utilize the entire loop file system that includes the system file image, the system configuration file image, and the user data file image.

In this case, the interface module 106 serves to provide a root file system service function for the respective virtual machines 170-1 and 170-2 by performing an emulation function for the respective virtual machines 170-1 and 170-2.

Meanwhile, by allowing the file image and data file image separated for each virtual machine to be connected to the root file system R after virtual machine provisioning, the file image and data file image do not need to be performed when provisioning a virtual machine, and thus, the provisioning speed can be further improved and resource usage can be further reduced.

That is, in the disclosed embodiment, when provisioning the virtual machine, the OS image 152 is loaded into the memory of each virtual machine and executed, the root file system R is built with only the system file image 161, and then the system configuration file image and user data file image separated for each virtual machine are connected to the root file system R, and thus, the speed of virtual machine provisioning can be improved while resource usage can be reduced.

Figure 5:
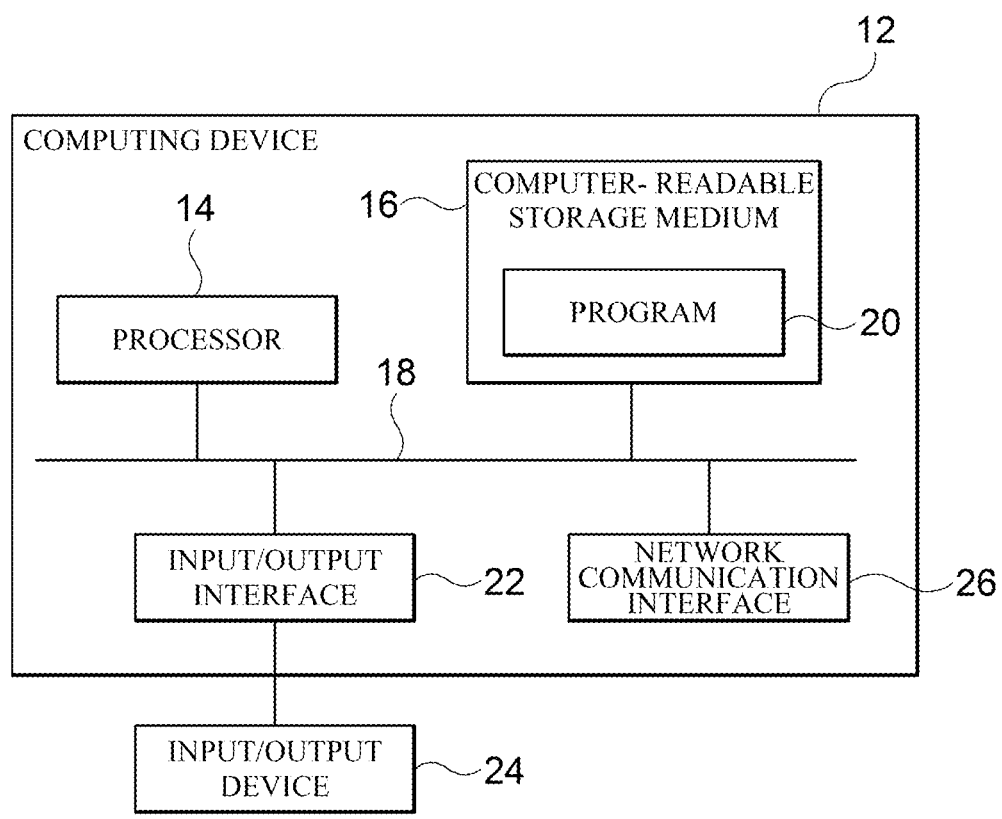
FIG. 5 is a block diagram illustratively describing a computing environment including a computing device suitable for use in exemplary embodiments.

FIG. 5 is a block diagram for illustratively describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In an embodiment, the computing device 12 may be the virtual machine system 100.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so as to cause the computing device 12 to perform operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A virtual machine provisioning method comprising:
creating, by a provisioning module, a virtual machine image template based on a property of a virtual machine image, the virtual machine image template including only an operating system image and a system file image that have a read-only property of the virtual machine image, wherein a system configuration file image and a user data file image having read and write properties are excluded from the virtual machine image template;
extracting, by a virtual machine management module, the OS image of the virtual machine image template according to a virtual machine creation command from a user, to load the OS image into a memory allocated to a virtual machine, and execute the OS image; and
extracting, by an interface module, the system file image of the virtual machine image template according to the virtual machine creation command to build a root file system for the virtual machine.

2. The virtual machine provisioning method of claim 1, wherein the system file image of the built root file system is used in common for each virtual machine.

3. The virtual machine provisioning method of claim 2, further comprising:
storing, by the virtual machine management module, the system configuration file image created based on system setting set by the user for each virtual machine and the user data file image created according to execution of each virtual machine in a disk storage.

4. The virtual machine provisioning method of claim 3, wherein, in the storing in the disk storage, for each virtual machine, the system configuration file image and the user data file image are stored in the disk storage by separating the file images as a partition.

5. The virtual machine provisioning method of claim 3, further comprising:
connecting, by the interface module, the system configuration file image and the user data file image stored in the disk storage to the built root file system.

6. The virtual machine provisioning method of claim 5, further comprising:
connecting, by the virtual machine management module, the OS image of each virtual machine to the built root file system through the interface module.

7. The virtual machine provisioning method of claim 6, wherein, in the connecting, the OS image of each virtual machine is connected to the system configuration file image and the user data file image of the corresponding virtual machine in the built root file system.

8. A virtual machine system comprising:
a provisioning module that creates a virtual machine image template based on a property of a virtual machine image, the virtual machine image template, the virtual machine image template including only an operating system image and a system file image that have a read-only property of a virtual machine image, wherein a system configuration file image and a user data file image having read and write properties are excluded from the virtual machine image template;
a virtual machine management module that extracts the OS image of the virtual machine image template according to a virtual machine creation command from a user, to load the OS image into a memory allocated to a virtual machine, and execute the OS image; and
an interface module that extracts the system file image of the virtual machine image template according to the virtual machine creation command to build a root file system for the virtual machine,
wherein the provisioning module, the virtual machine management module and the interface module is a combination of a hardware and a software configured for driving the hardware.

9. The virtual machine system of claim 8, wherein the system file image of the built root file system is used in common for each virtual machine.

10. The virtual machine system of claim 9, wherein the virtual machine management module stores the system configuration file image created based on system setting set by the user for each virtual machine and the user data file image created according to execution of each virtual machine in a disk storage.

11. The virtual machine system of claim 10, wherein the virtual machine management module stores, for each virtual machine, the system configuration file image and the user data file image in the disk storage by separating the file images as a partition.

12. The virtual machine system of claim 10, wherein the interface module connects the system configuration file image and the user data file image stored in the disk storage to the built root file system.

13. The virtual machine system of claim 12, wherein the virtual machine management module connects the OS image of each virtual machine to the built root file system through the interface module.

14. The virtual machine system of claim 13, wherein the virtual machine management module connects the OS image of each virtual machine to the system configuration file image and the user data file image of the corresponding virtual machine in the built root file system through the interface module.

* * * * *